(12) United States Patent
Soo (10) Patent No.: US 9,275,260 B2
(45) Date of Patent: Mar. 1, 2016

(54) LOW PROFILE CONNECTOR

(71) Applicant: Molex, LLC, Lisle, IL (US)

(72) Inventor: Foong-Ching Soo, Singapore (SG)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/185,451

(22) Filed: Feb. 20, 2014

(65) Prior Publication Data

US 2014/0315437 A1 Oct. 23, 2014

(30) Foreign Application Priority Data

Feb. 20, 2013 (CN) .................. 2013 2 0079232 U
Feb. 20, 2013 (CN) .................. 2013 2 0079301 U
Feb. 20, 2013 (CN) .................. 2013 2 0079302 U
Feb. 20, 2013 (CN) .................. 2013 2 0079303 U (51) Int. Cl.
*H01R 24/00* (2011.01)
*G06K 7/00* (2006.01)
*H01R 12/72* (2011.01)

(52) U.S. Cl.
CPC ............ *G06K 7/0034* (2013.01); *G06K 7/0021* (2013.01); *H01R 12/721* (2013.01)

(58) Field of Classification Search
CPC .. H01R 12/714; H01R 12/57; H01R 12/7094; H01R 23/7068; H01R 12/721; H01R 12/716
USPC ........................ 439/626, 488, 541.5, 630, 631
See application file for complete search history.

(56) References Cited

U.S. PATENT DOCUMENTS

| | | | |
|---|---|---|---|
| 4,900,273 A | 2/1990 | Pernet | |
| 5,013,255 A | 5/1991 | Juret et al. | |
| 5,330,363 A * | 7/1994 | Gardner et al. | 439/188 |
| 6,126,464 A | 10/2000 | Chang | |
| 6,179,638 B1 | 1/2001 | Lim | |
| 6,267,619 B1 | 7/2001 | Nishioka | |
| 6,326,568 B2 | 12/2001 | Martucci et al. | |
| 7,101,207 B1 | 9/2006 | Chi-Te | |
| 7,427,206 B2 | 9/2008 | Takei et al. | |
| 7,744,422 B2 * | 6/2010 | Ting et al. | 439/630 |
| 8,100,722 B2 * | 1/2012 | Hu et al. | 439/626 |
| 8,197,272 B2 | 6/2012 | Matsunaga | |
| 8,724,311 B2 * | 5/2014 | Hsu | 361/679.4 |
| 2010/0144179 A1 * | 6/2010 | Guo et al. | 439/159 |
| 2011/0117762 A1 | 5/2011 | Beak et al. | |
| 2012/0149224 A1 * | 6/2012 | Tsuji et al. | 439/188 |

FOREIGN PATENT DOCUMENTS

| | | |
|---|---|---|
| CN | 201081824 Y | 7/2008 |
| CN | 201278378 Y | 7/2009 |
| CN | 201523134 U | 7/2010 |

* cited by examiner

*Primary Examiner* — Neil Abrams
*Assistant Examiner* — Travis Chambers
(74) *Attorney, Agent, or Firm* — Stephen L. Sheldon (57) ABSTRACT

An electrical connector is used to mount to a circuit board. The electrical connector comprises a housing having a spacer, a cage and a terminal block. The cage is engaged with the housing, the cage and the housing together are provided on the circuit board and the spacer is spaced apart from the circuit board, so as to together define a first slot positioned above the spacer and a receiving space positioned under the spacer and is adjacent to the circuit board. The terminal block comprises an insulative plate positioned in the receiving space and the insulative plate is parallel to and spaced apart from the spacer so as to in turn form a second slot in the receiving space.

5 Claims, 10 Drawing Sheets

LOW PROFILE CONNECTOR

RELATED APPLICATIONS

This application claims priority to Chinese Application No. 201320079301.9, filed Feb. 20, 2013, to Chinese Application No. 201320079232.1, filed Feb. 20, 2013, to Chinese Application No. 201320079302.3, filed Feb. 20, 2013, and to Chinese Application No. 201320079303.8, filed Feb. 20, 2013, all of which are incorporated herein by reference in their entirety.

TECHNICAL FIELD

The present disclosure relates to an electrical connector, and particularly relates to an electrical connector which may allow two electronic cards to mate therewith at the same time.

BACKGROUND ART

With development of wireless communication technology, at present, a mobile phone has been developed on a type which may read two Subscriber Identity Module (SIM) cards. Because the SIM card is electrically connected to a circuit board via an electrical connector, in order to meet the requirement on the connector which may mate with two SIM cards at the same time and reduce a surface area of the circuit board occupied by itself, a stack-type SIM card connector is proposed, as disclosed in Taiwanese utility model patent publication No. TWM324877 (corresponding to Chinese patent grant Publication No. CN201081824Y).

In the electrical connector as disclosed in the above patent, a first housing and a second housing (which are formed of an insulative material) which are engaged in a vertical direction and a shield together define two card insertion spaces respectively positioned in an upper layer and a lower layer. However, because the second housing in the lower layer has a larger surface area, when the electrical connector is connected to a circuit board by means of reflow, the second housing is easy to warp due to heat so that the whole coplanarity of the second housing is reduced. Moreover, during reflow, the second housing is subjected to more heat than the first housing, and thus the warping potential of the second housing is larger than that of the first housing, thereby resulting in that assembly of the first housing and the second insulative becomes tight, and the first housing and the second insulative will affect on each other in warpage and coplanarity after reflow, which results in that the quality of the electrical connector is not stable. Moreover, obviously, the design of the second housing itself is more complicated, which requires more cost in material and manufacturing process.

SUMMARY OF THE INVENTION

Therefore, an object of the present disclosure is to provide an electrical connector which may reduce warpage and is easier to manufacture and may allow two electronic cards to mate with.

Another object of the present disclosure is to provide an electrical connector which may further have a switch unit besides may reduce warpage and is easier to manufacture and may allow two electronic cards to mate with.

An electrical connector of the present disclosure is used to mount to a circuit board, the electrical connector comprises: a housing having a spacer, a plurality of first terminals provided to the housing, a cage and a terminal block. The cage is engaged with the housing, the cage and the housing together are provided on the circuit board and the spacer is spaced apart from the circuit board, so as to together define a first slot positioned above the spacer and a receiving space positioned under the spacer and adjacent to the circuit board. And one of the housing and the cage forms two first inner wall surfaces defining two side boundaries of the first slot and two second inner wall surfaces defining two side boundaries of the receiving space, the two first inner wall surfaces and the two second inner wall surfaces extend respectively along a card insertion direction. The terminal block comprises an insulative plate and a plurality of second terminals provided to the insulative plate, and is provided on the circuit board and positioned in the receiving space and spaced apart from the two second inner wall surfaces, and the insulative plate is parallel to and spaced apart from the spacer so as to in turn form a second slot in the receiving space.

In an embodiment, at least one of the first inner wall surfaces and the second inner wall surfaces is formed by the housing. In an embodiment, the housing further has two side walls vertically extending respectively from the spacer to form the first inner wall surfaces and/or the second inner wall surfaces. In an embodiment, the two side walls respectively have upper wall portions forming the first inner wall surfaces and lower wall portions forming the second inner wall surfaces.

In an embodiment, the housing further comprises a side wall and a switch unit provided to the side wall, the side wall further has a mounting space receiving the switch unit and a through hole extending from an end face of the side wall along the card insertion direction and extending into the mounting space, a pin-like element can be inserted into the through hole so as to contact and push the switch unit. In an embodiment, the switch unit comprises an abutting portion formed to the cage and a resilient terminal fixed in the housing, the resilient terminal can be enabled by the pin-like element so as to change a contact state between the resilient terminal and the abutting portion. In an embodiment, the resilient terminal has a pushed portion obliquely facing the through hole and a contact portion driven by the pushed portion, and the contact portion can contact the abutting portion.

In an embodiment, the abutting portion is a protruding piece formed by integrally punching the cage and enters into the mounting space. In an embodiment, the resilient terminal further has a fixed portion fixed to the housing and positioned above the through hole and a connecting portion connecting the pushed portion and the contact portion, the pushed portion extends obliquely and downwardly from a position of the fixed portion adjacent to the through hole, and the connecting portion is reversely bent from the pushed portion and extends obliquely and upwardly, the contact portion extends from a distal end of the connecting portion and is separated from the abutting portion in a normal state, but when the pin-like element enters into the through hole and contacts and pushes the pushed portion and the pushed portion in turn drives the connecting portion and the contact portion to move, the contact portion contacts the abutting portion.

In an embodiment, the resilient terminal further has a fixed portion fixed to the housing and positioned under the through hole, the pushed portion extends obliquely and upwardly from a position of the fixed portion adjacent to the through hole, the contact portion extends from a distal end of the pushed portion and contacts the abutting portion in a normal state, but when the pin-like element enters into the through hole and contacts and pushes the pushed portion and the pushed portion in turn drives the contact portion to move, the contact portion is separated from the abutting portion.

BRIEF DESCRIPTION OF THE DRAWINGS

The other features and effects of the present disclosure will be apparent through the embodiments in combination with the Figures, and in which.

DETAILED DESCRIPTION OF THE PREFERRED EMBODIMENTS

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

Benefits of the present disclosure is as follows: as the terminal block is provided in the receiving space formed by the housing and the cage so as to form the second slot, the insulative plate can be simplified in structure and can be reduced in surface area, and the insulative plate is separated from the housing. The insulative plate itself would not easily warp, but also the insulative plate and the housing do not affect each other in warping amount and coplanarity, so that the qualified yield of the electrical connector may be promoted. Moreover, the whole structure of the insulative plate is simple and easy to manufacture, material and cost of manufacturing process may be saved. Moreover, in comparison with that a switch apparatus is generally provided separately, the switch unit is incorporated in the electrical connector, so that a space occupied by the switch apparatus and manufacture cost may be significantly saved. Moreover, when the electrical connector is assembled in an electronic device, such as a mobile phone, once the mobile phone crashes, a user needs not to open the mobile phone, instead directly inserts the pin-like element into the through hole from the outside of the casing so as to enable the switch unit, therefore the reset function to restart the mobile phone can be achieved.

Referring to FIGS. 1-5, an embodiment of an electrical connector 100 of the present disclosure is used to mount on a circuit board 9, the electrical connector 100 comprises an housing 1, a plurality of first terminals 2 provided to an housing 1, a cage 3 and a terminal block 4.

Figure 1:
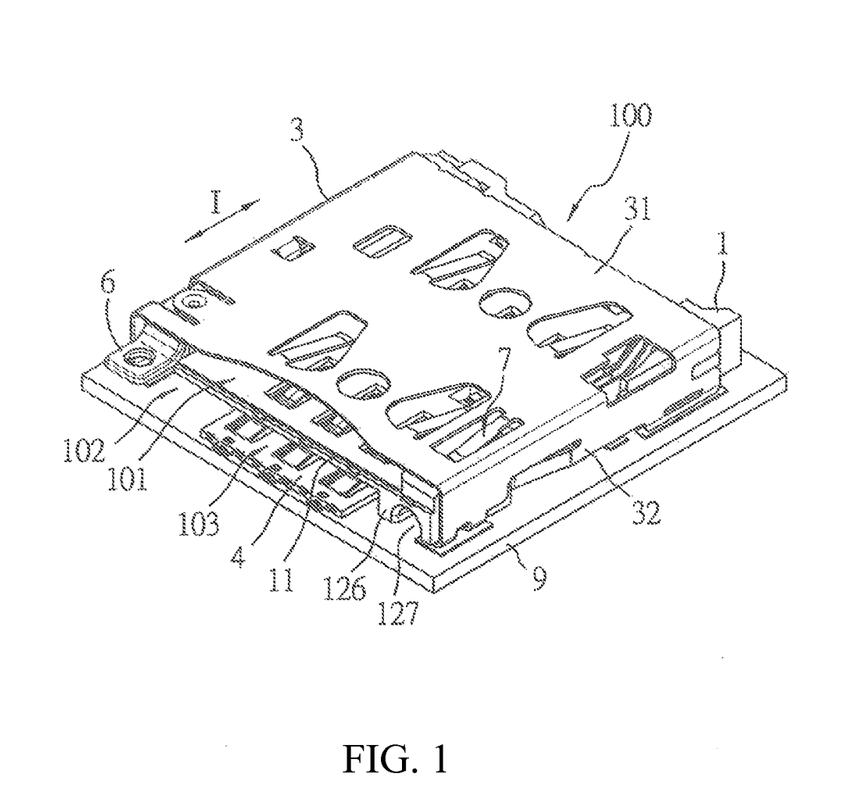
FIG. 1 is a perspective view illustrating an embodiment of an electrical connector mounted to a circuit board.
Figure 2:
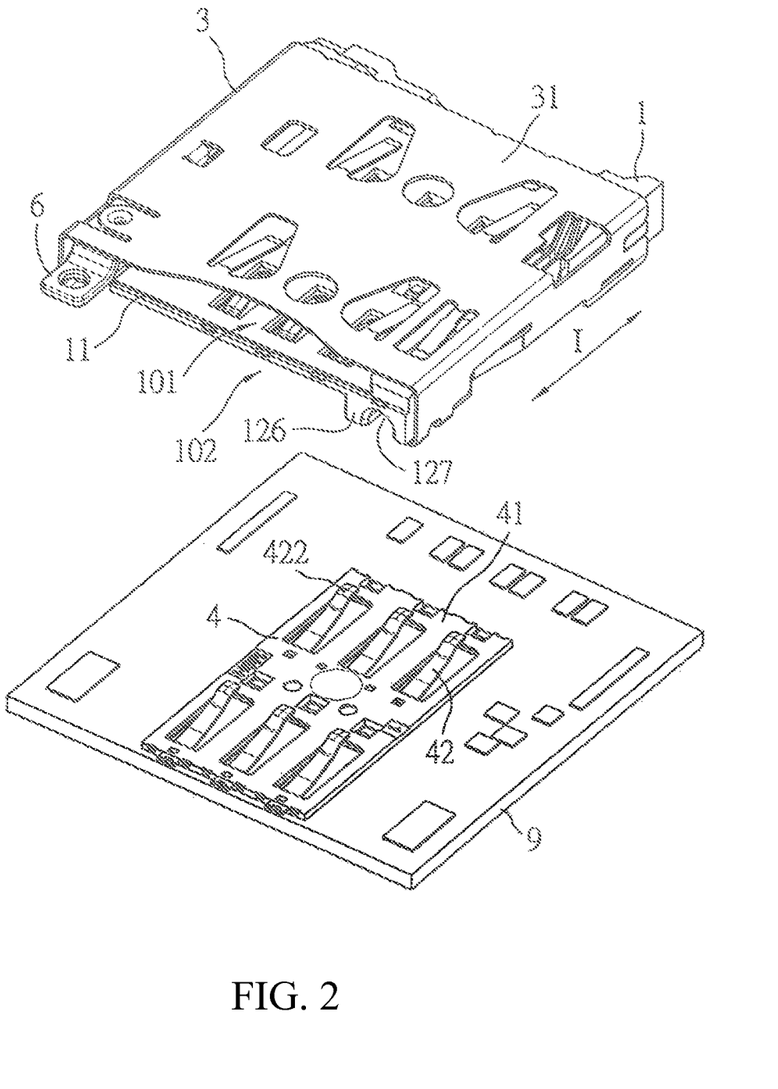
FIG. 2 is an exploded perspective view illustrating an assembling relationship between the embodiment and a circuit board.
Figure 3:
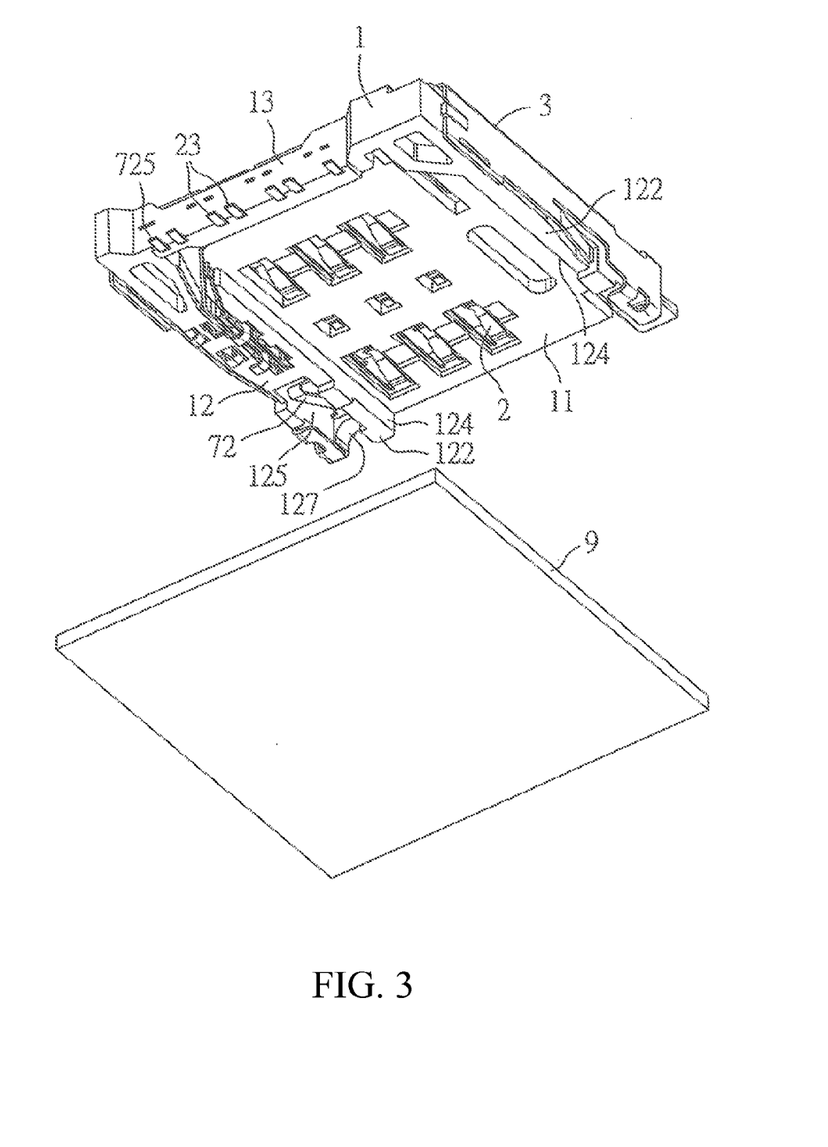
FIG. 3 is view of FIG. 2 viewed from another angle.
Figure 4:
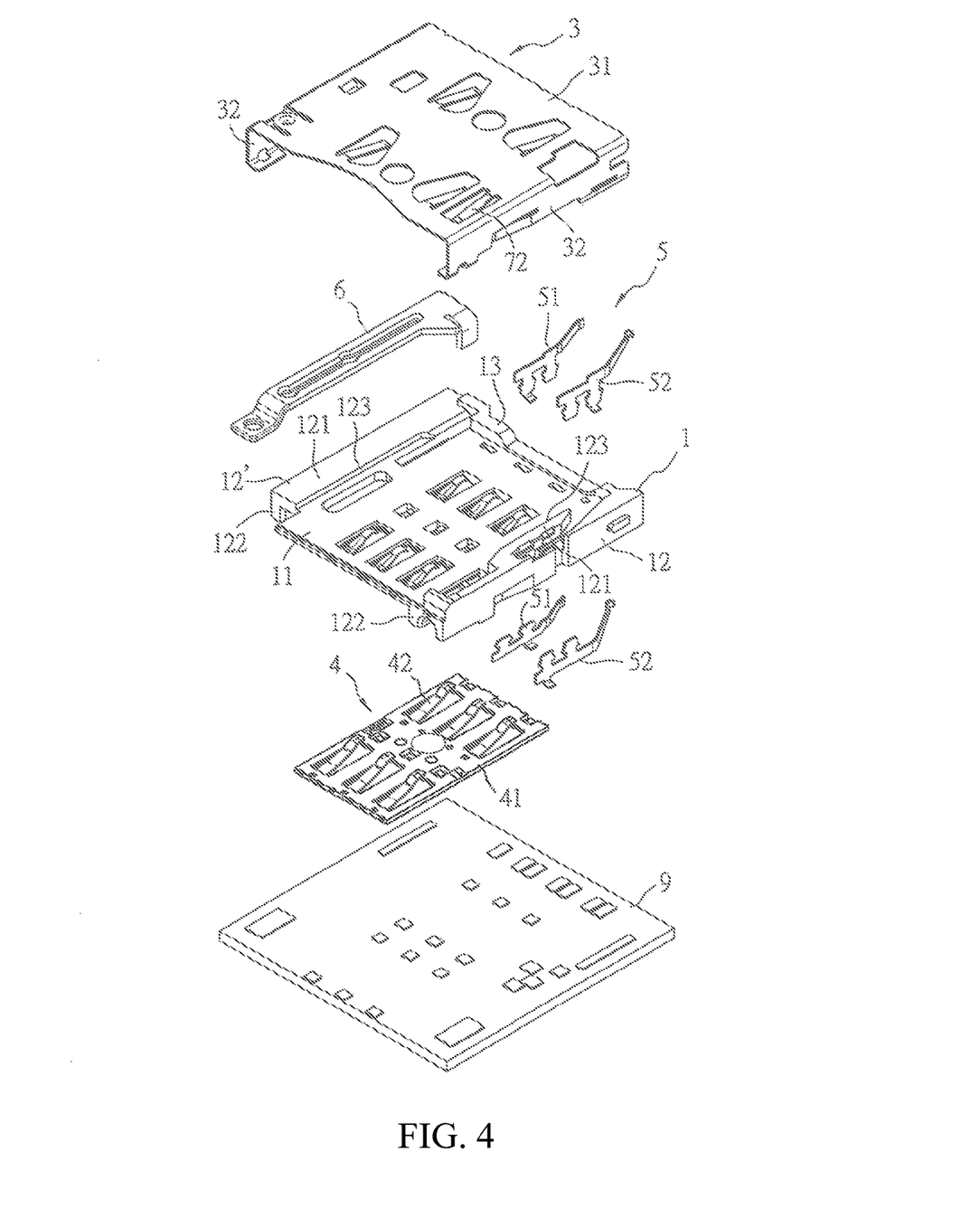
FIG. 4 is an exploded perspective view illustrating an assembling relationship among components of the embodiment.
Figure 5:
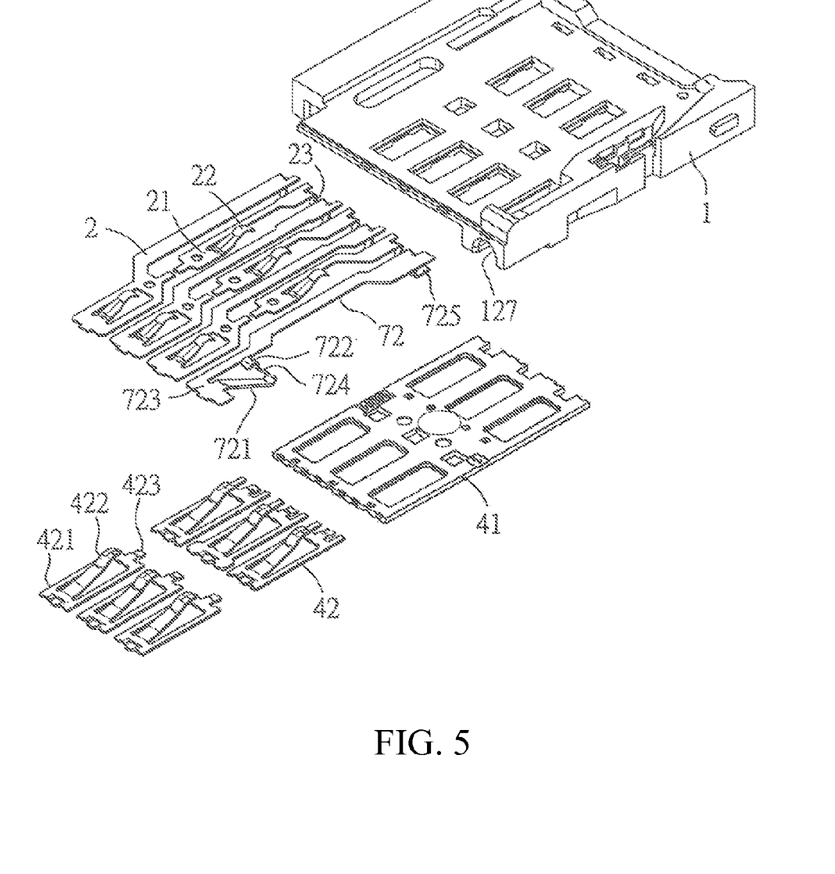
FIG. 5 is a perspective view illustrating an engagement relationship between first terminals and an housing and an engagement relationship between second terminals and an insulative plate of the embodiment.
Figure 6:
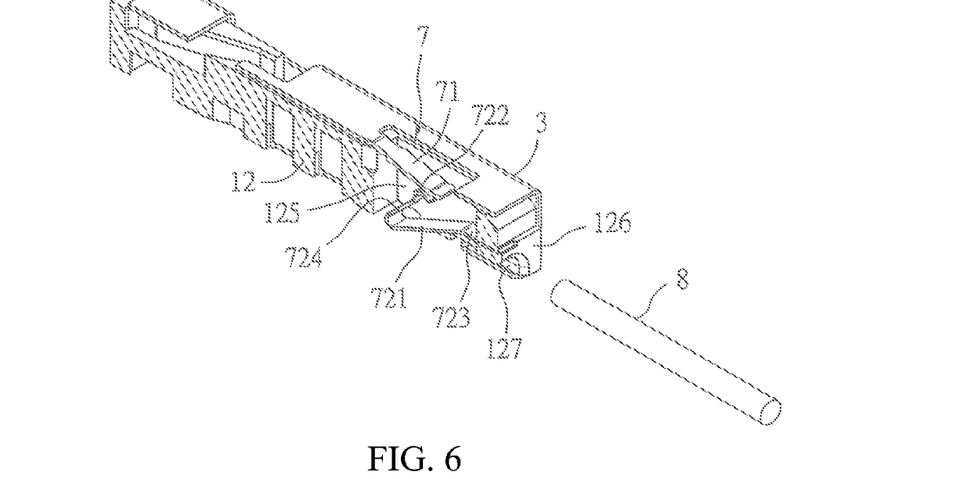
FIG. 6 is a perspective cut-away view illustrating an assembling relationship among a switch unit and the housing and the cage.
Figure 7:
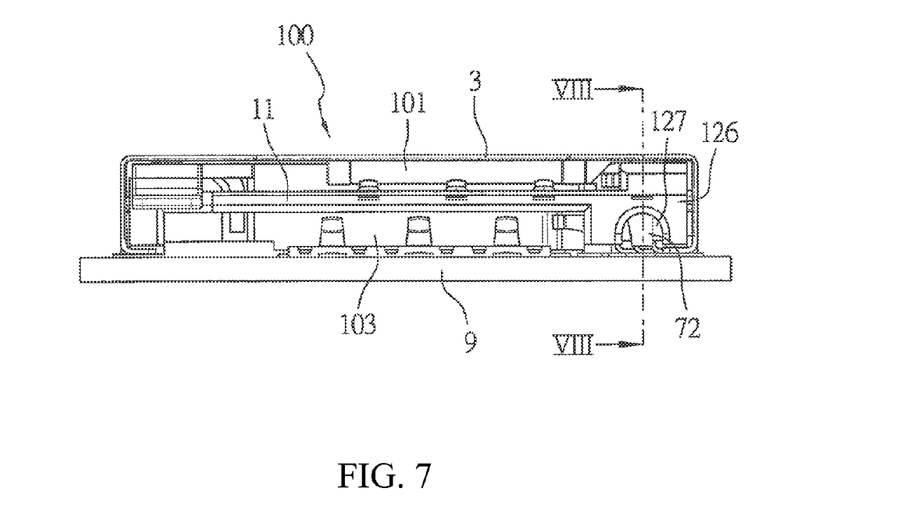
FIG. 7 is a front view illustrating a positional relationship between a resilient terminal of the switch unit and a through hole of the housing.
Figure 8:
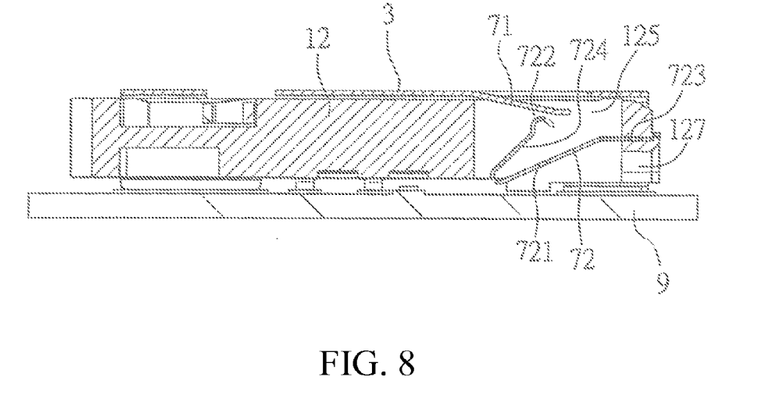
FIG. 8 is a cross sectional view taken along a line VIII-VIII of FIG. 7 and illustrating the resilient terminal of the switch unit in a normal state.

The housing 1 has a spacer 11, two side walls 12, 12' extending vertically respectively from the spacer 11, and a rear stop wall 13. The side walls 12, 12' each have an upper wall portion 121 and a lower wall portion 122. The upper wall portion 121 forms a first inner wall surface 123, and the lower wall portion 122 forms a second inner wall surface 124, the first inner wall surface 123 and the second inner wall surface 124 respectively extend along a card insertion direction I. The rear stop wall 13 connects the two side walls 12, 12' and is connected to a rear side of the spacer 1.

The cage 3 has a top plate 31 and two side plates 32 extending respectively from opposite sides of the top plate 31. The cage 3 is engaged with the housing 1 and the cage 3 and the housing 1 together are provided on a circuit board 9 and the spacer 11 is spaced apart from the circuit board 9, so as to together define a first slot 101 positioned above the spacer 11 and a receiving space 102 positioned under the spacer 11 and is adjacent to the circuit board 9. In the embodiment, two side boundaries of the first slot 101 along the card insertion direction I are defined by the first inner wall surfaces 123 of the housing 1, and two side boundaries of the receiving space 102 along the card insertion direction I are defined by the second inner wall surfaces 124 of the housing 1. However, in an equivalent embodiment, the housing 1 may only have the upper wall portions 121 of the side walls 12, 12', and the two side boundaries of the receiving space 102 are defined by the second inner wall surfaces formed by the side plates 32 of the cage 3; alternatively, the housing 1 may only has the lower wall portions 122 of the side walls 12, 12', and the two side boundaries of the first slot 101 are defined by the first inner wall surfaces formed by the side plates 32 of the cage 3. Alternatively, the housing 1 may not have the side walls 12, 12', but the two side boundaries of the first slot 101 and the two side boundaries of the receiving space 102 are respectively defined by the first inner wall surfaces and the second inner wall surfaces formed by the side plates 32 of the cage 3. In other words, the first inner wall surfaces and the second inner wall surfaces respectively defining the two side boundaries of the first slot 101 and the two side boundaries of the receiving space 102 may be respectively formed by one of the housing 1 and the cage 3.

The terminal block 4 comprises an insulative plate 41 and a plurality of second terminals 42 provided to the insulative plate 41. The terminal block 4 is provided on the circuit board 9 and is positioned in receiving space 102 and is spaced apart from the two second inner wall surfaces 124, and the insulative plate 41 is parallel to and spaced apart from the spacer 11, and in turn a second slot 103 is formed in the receiving space 102. The first slot 101 and the second slot 103 each may allow insertion of an electronic card (not shown), such as a SIM card. In the embodiment, the first terminals 2 and the second terminals 42 are respectively engaged with and fixed to the housing 1 and the insulative plate 41 by means of insert molding. The each first terminal 2 has a fixed portion 21 embedded in the housing 1, a resilient contact portion 22 extending from the fixed portion 21 and extending into the first slot 101, and a soldering portion 23 extending from the fixed portion 21 and extending out from the rear stop wall 13 so as to be electrically connected to the circuit board 9. The each second terminal 42 has a fixed portion 421 embedded in the insulative plate 41, a resilient contact portion 422 extending from the fixed portion 421 and extending into the second slot 103, and a soldering portion 423 extending from the fixed portion 421 and extending out from the insulative plate 41 so as to be electrically connected to the circuit board 9. An electronic card inserted into the first slot 101 is interposed between the top plate 31 of the cage 3 and the spacer 11 and is electrically connected to the resilient contact portions 22 of the first terminals 2. An electronic card inserted into the second slot 103 is interposed between the spacer 11 and the insulative plate 41 and is electrically connected to the resilient contact portions 422 of the second terminal 42.

Because the insulative plate 41 of the terminal block 4 is a plate-like shape, has a relative small surface area as a whole and is separated from the housing 1, the insulative plate 41 itself would not easily warp. In addition, the insulative plate 41 and the housing 1 do not affect each other in warping amount and coplanarity, which can be easily controlled, so that the qualified yield of the electrical connector may be promoted. Moreover, the whole structure of the insulative plate 41 is simple and easy to manufacture, and material may be saved due to small volume of the insulative plate 41, therefore material and cost of manufacturing process may be saved.

In the embodiment, the electrical connector 100 further comprises a detection unit 5 and a card eject mechanism 6. The detection unit 5 comprises two groups of detection terminals 51, 52 respectively provided at an upper side and a lower side of the spacer 11, the detection terminals 51, 52 positioned at the upper side of the spacer 11 are used to detect whether an electronic card is inserted into the first slot 101, the detection terminals 51, 52 positioned at the lower side of the spacer 11 are used to detect whether another electronic card is inserted into the second slot 103. The card eject mechanism 6 is positioned on the side wall 12', may slide along the card insertion direction I, and is used to eject the electronic cards respectively from the first slot 101 and the second slot 103.

Figure 9:
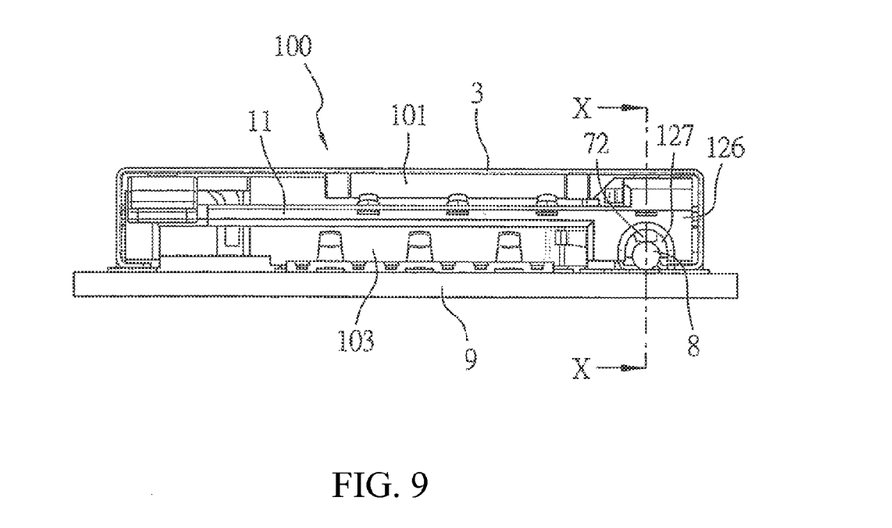
FIG. 9 is a front view illustrating a pin-like element is inserted into the through hole.
Figure 10:
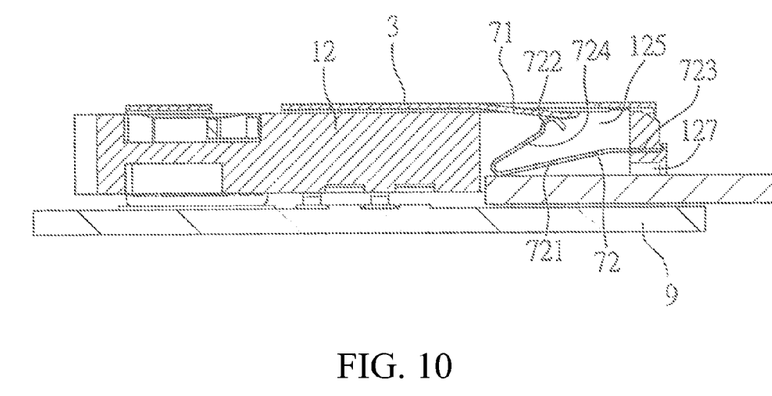
FIG. 10 is a cross sectional view taken along a line X-X of FIG. 9 and illustrating an operative relationship between the pin-like element and the resilient terminal when the pin-like element is inserted into the through hole of the housing.

Moreover, referring to FIGS. 5-8, in the embodiment, the electrical connector 100 further comprises a switch unit 7 provided to the side wall 12. The side wall 12 further has a mounting space 125 receiving the switch unit 7 and a through hole 127 extending from the end face 126 of the side wall 12 along the card insertion direction I and extending into the mounting space 125. The switch unit 7 comprises an abutment portion 71 formed to the cage 3 and a resilient terminal 72 fixed in housing 1. The resilient terminal 72 has a pushed portion 721 obliquely facing the through hole 127 and a contact portion 722 driven by the pushed portion 721, and the contact portion 722 can contact the abutment portion 71. In the embodiment, the abutment portion 71 is a protruding piece formed by integrally punching the cage 3 and enters into the mounting space 125. However, the abutment portion 71 may also be a local region of the cage 3, as long as the resilient terminal 72 can contact the contact portion 722. Specifically, in the embodiment, the resilient terminal 72 and the first terminals 2 together are engaged with and fixed to the housing 1 by means of insert molding. And, the resilient terminal 72 further has a fixed portion 723 fixed to the housing 1 and positioned above the through hole 127, a connecting portion 724 connecting the pushed portion 721 and the contact portion 722, and a soldering portion 725 extending from the fixed portion 723 and extending out from to the rear stop wall 13 of the housing 1. The pushed portion 721 extends obliquely and downwardly from a position of the fixed portion 723 adjacent to the through hole 127, and the connecting portion 724 is reversely bent from the pushed portion 721 and extends obliquely and upwardly and the contact portion 722 extends from a distal end of the connecting portion 724 and is separated from the abutting portion 71 in a normal state. Referring to FIG. 9 and FIG. 10, a pin-like element 8 may be inserted into the through hole 127 to enable the switch unit 7. The pin-like element 8 enters into the through hole 127 and then contacts and pushes the pushed portion 721 which drives the connecting portion 724 and the contact portion 722 to move, so as to allow the contact portion 722 to contact the abutting portion 71. That is, a contact state between the resilient terminal 72 and the abutting portion 71 may be changed due to pushing the resilient terminal 72 by the pin-like element 8, in the embodiment, a state that the resilient terminal 72 does not contact the abutting portion 71 is changed to a state that the resilient terminal 72 contacts the abutting portion 71. Therefore, it may allow the switch unit 7 to generate a signal to start a default operation. For example, the switch unit 7 is acted as a reset switch, when the switch unit 7 is enabled by the pin-like element 8, a circuit system of an electronic device (not shown) provided with the electrical connector 100 may be reset. As such, in comparison with that a switch apparatus (not shown) is generally provided separately, the switch unit 7 is incorporated in the electrical connector 100, so that a space occupied by the switch apparatus and manufacture cost may be significantly saved. Moreover, when the electrical connector 100 is assembled in an electronic device, such as a mobile phone (not shown), and makes the through hole 127 exposed to the outside or an aperture is opened in a casing of the electronic device and is communicated with the through hole 127, once the mobile phone crashes, a user needs not to open the mobile phone, instead directly inserts the pin-like element 8 into the through hole 127 from the outside of the casing so as to enable the switch unit 7, therefore the reset function to restart the mobile phone can be achieved.

Figure 11:
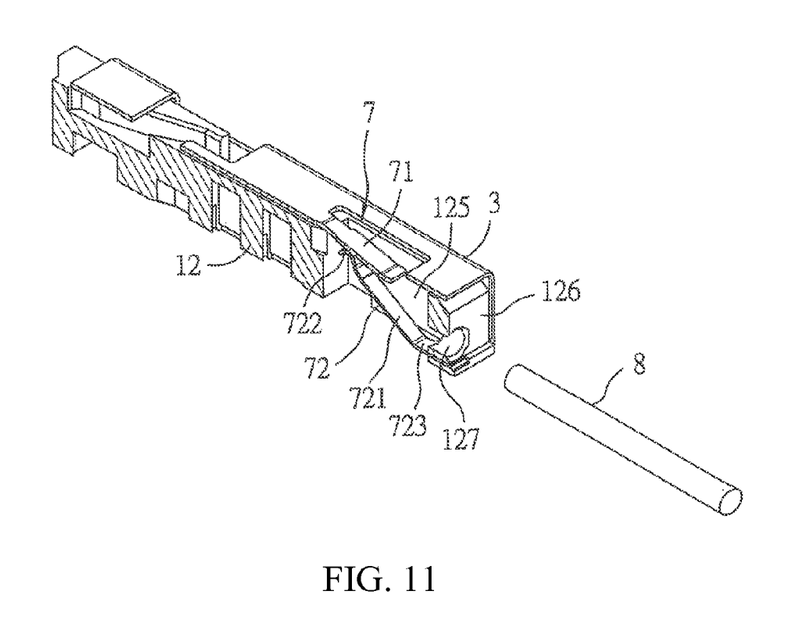
FIG. 11 is a view similar to FIG. 6 and illustrates another embodiment of the switch unit.
Figure 12:
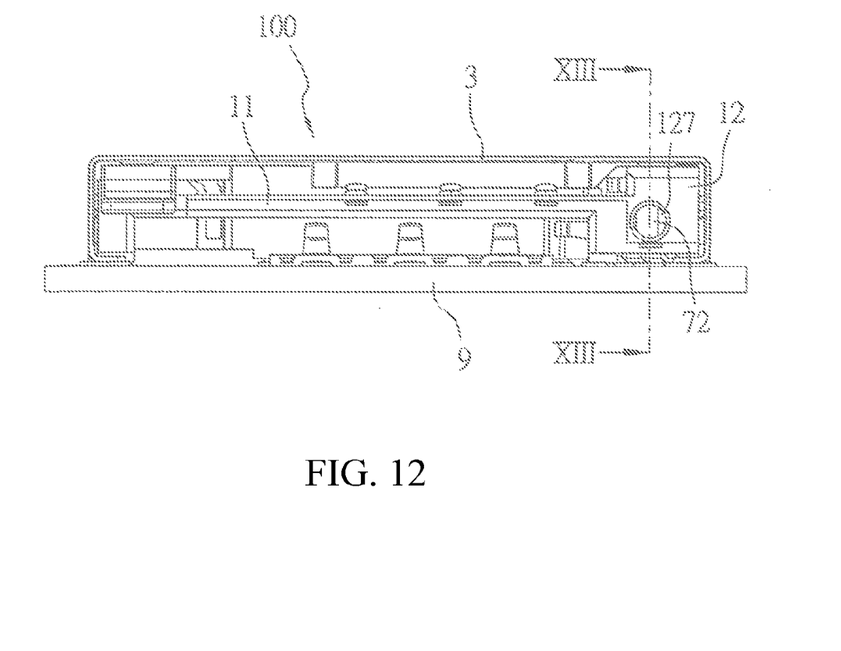
FIG. 12 is a front view illustrating a positional relationship between a resilient terminal of the switch unit and a through hole of an housing of the another embodiment.
Figure 13:
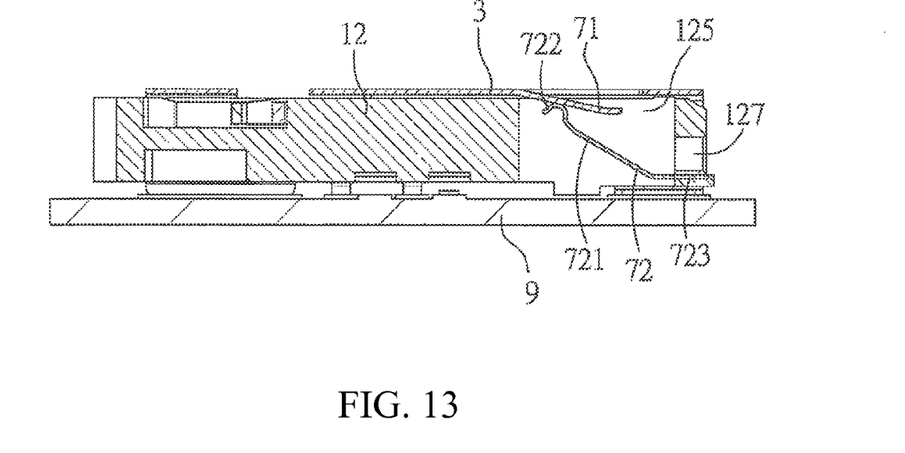
FIG. 13 is a cross sectional view taken along a line XIII-XIII of FIG. 12 and illustrating the resilient terminal of the switch unit in a normal state.
Figure 14:
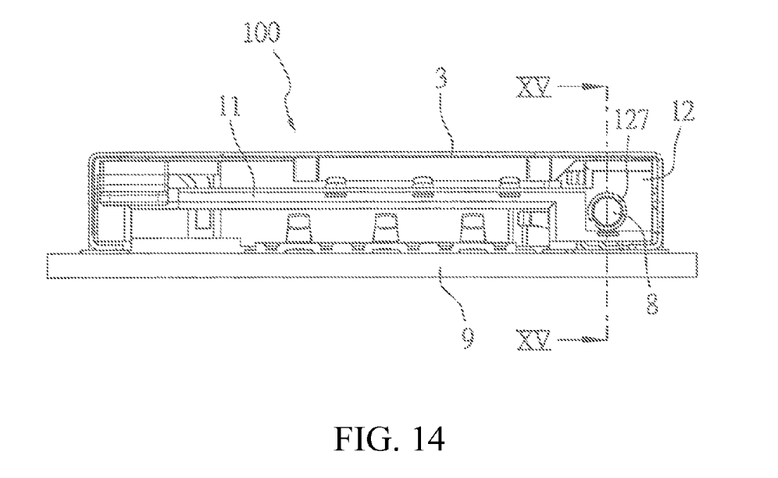
FIG. 14 is a front view illustrating a pin-like element is inserted into the through hole of the housing.
Figure 15:
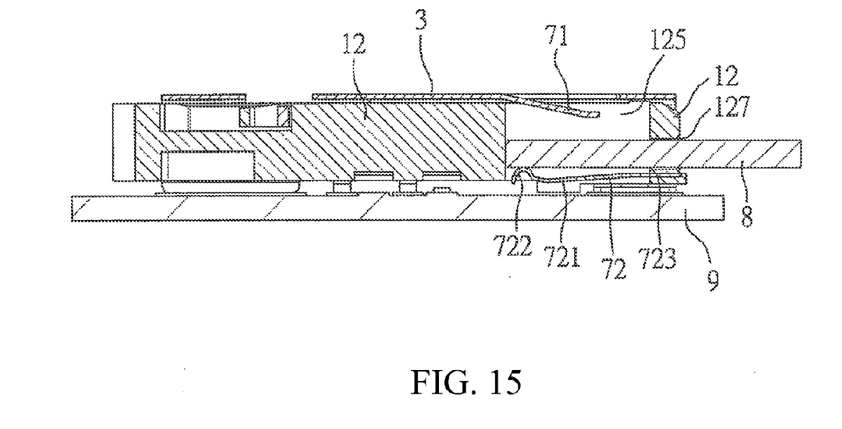
FIG. 15 is a cross sectional view taken along a line XV-XV of FIG. 14; and illustrating an operative relationship between the pin-like element and the resilient terminal of the switch unit when the pin-like element is inserted into the through hole of the housing.

In the embodiment, the resilient terminal 72 is separated from the abutment portion 71 in the normal state and the resilient terminal 72 contacts the abutment portion 71 when the resilient terminal 72 is enabled by the pin-like element 8, however, in an equivalent embodiment, the resilient terminal 72 contacts the abutment portion 71 in a normal state and the resilient terminal 72 is separated from the abutment portion 71 when the resilient terminal 72 is enabled by the pin-like element 8. For example, referring to FIGS. 11-13, in another embodiment of the resilient terminal 72, the fixed portion 723 of the resilient terminal 72 is fixed to the housing 1 and is positioned under the through hole 127, the pushed portion 721 extends obliquely and upwardly from a position of the fixed portion 723 adjacent to the through hole 127, the contact portion 722 directly extends from the distal end of the pushed portion 721 without connection via the connecting portion 724 and contacts the abutting portion 71 in a normal state. Referring to FIG. 14 and FIG. 15, when the pin-like element 8 enters into the through hole 127 and contacts and pushes the pushed portion 721 which in turn drives the contact portion 722 to move, so that the contact portion 722 is separated from the abutting portion 71. As such, a contact state between the contact portion 722 and the abutting portion 71 may also be changed, in this embodiment, a state that the resilient terminal 72 contacts the abutting portion 71 is changed to a state that the resilient terminal 72 does not contact the abutting portion 71, similarly an effect of allowing the switch unit 7 to generate a signal to start a default operation can be achieved.

In conclusion, by that the terminal block 4 is provided in the receiving space 102 formed by the housing 1 and the cage 3 so as to form the second slot 103, the insulative plate 41 can be simplified in structure and can be reduced in surface area, and the insulative plate 41 is separated from the housing 1, not only the insulative plate 41 itself would not easily warp, but also the insulative plate 41 and the housing 1 do not affect each other in warping amount and coplanarity, so that the qualified yield of the electrical connector may be promoted. Moreover, the whole structure of the insulative plate 41 is simple and easy to manufacture, material and cost of manufacturing process may be saved. Moreover, in comparison with that a switch apparatus is generally provided separately, the switch unit 7 is incorporated in the electrical connector 100, so that a space occupied by the switch apparatus and manufacture cost may be significantly saved. Moreover, when the electrical connector 100 is assembled in an electronic device, such as a mobile phone, once the mobile phone crashes, a user needs not to open the mobile phone, instead directly inserts the pin-like element 8 into the through hole 127 from the outside of the casing so as to enable the switch unit 7, therefore the reset function to restart the mobile phone can be achieved.

However, the above described are only the specific embodiments, which cannot limit the scope of the claims of the present disclosure, namely simple equivalent variations and modifications made according to the claims and the content of the present disclosure are still fallen within the scope of the claims of the present disclosure.

What is claimed is:

1. An electrical connector for mounting on a circuit board, comprising:
a housing having a spacer;
a plurality of first terminals supported by the housing;
a cage engaged with the housing, the cage and the housing together configured to be supported on the circuit board and the spacer being spaced apart from the circuit board, so as to together define a first slot positioned above the spacer and a receiving space positioned under the spacer and being adjacent to the circuit board, and one of the housing and the cage forming two first inner wall surfaces defining two side boundaries of the first slot and two second inner wall surfaces defining two side boundaries of the receiving space, the two first inner wall surfaces and the two second inner wall surfaces extending respectively along a card insertion direction; and
a terminal block comprising an insulative plate and a plurality of second terminals supported by the insulative plate, the terminal block configured to be positioned in the receiving space and spaced apart from the two second inner wall surfaces, the insulative plate being parallel to and spaced apart from the spacer so as to form a second slot in the receiving space, wherein the housing further comprises a side wall and a switch unit provided to the side wall, the side wall further has a mounting space receiving the switch unit and a through hole extending from an end face of the side wall along the card insertion direction and extending into the mounting space, a pin-like element can be inserted into the through hole so as to enable the switch unit and wherein the switch unit comprises an abutting portion formed to the cage and a resilient terminal fixed in the housing, the resilient terminal can be enabled by the pin-like element so as to change a contact state between the resilient terminal and the abutting portion.

2. The electrical connector according to claim 1, wherein the resilient terminal has a pushed portion obliquely facing the through hole and a contact portion driven by the pushed portion, and the contact portion can contact the abutting portion.

3. The electrical connector according to claim 2, wherein the abutting portion is a protruding piece formed by integrally punching the cage and enters into the mounting space.

4. The electrical connector according to claim 2, wherein the resilient terminal further has a fixed portion fixed to the housing and positioned above the through hole and a connecting portion connecting the pushed portion and the contact portion, the pushed portion extends obliquely and downwardly from a position of the fixed portion adjacent to the through hole, and the connecting portion is reversely bent from the pushed portion and extends obliquely and upwardly, the contact portion extends from a distal end of the connecting portion and is separated from the abutting portion in a normal state, but when the pin-like element enters into the through hole and contacts and pushes the pushed portion and the pushed portion in turn drives the connecting portion and the contact portion to move, the contact portion contacts the abutting portion.

5. The electrical connector according to claim 2, wherein the resilient terminal further has a fixed portion fixed to the housing and positioned under the through hole, the pushed portion extends obliquely and upwardly from a position of the fixed portion adjacent to the through hole, the contact portion extends from a distal end of the pushed portion and contacts the abutting portion in a normal state, but when the pin-like element enters into the through hole and contacts and pushes the pushed portion and the pushed portion in turn drives the contact portion to move, the contact portion is separated from the abutting portion.

* * * * *